Sept. 16, 1941.   J. E. SNYDER   2,256,156
PACKAGING
Filed July 12, 1939
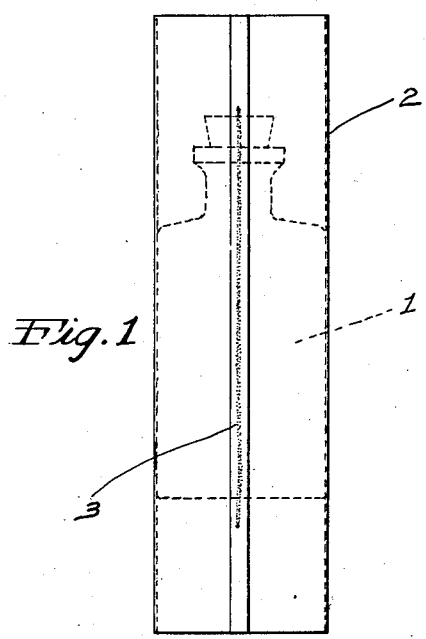
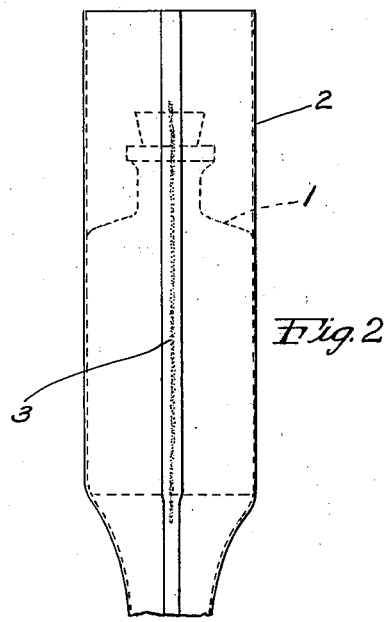
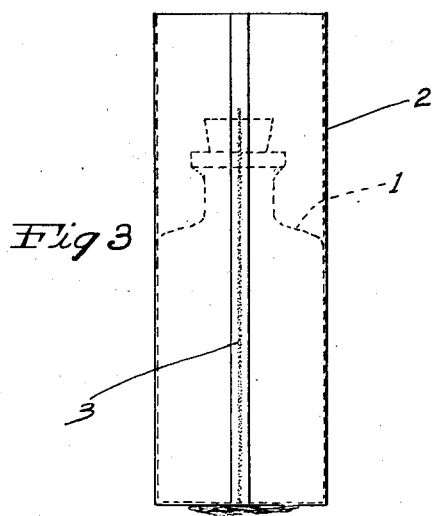
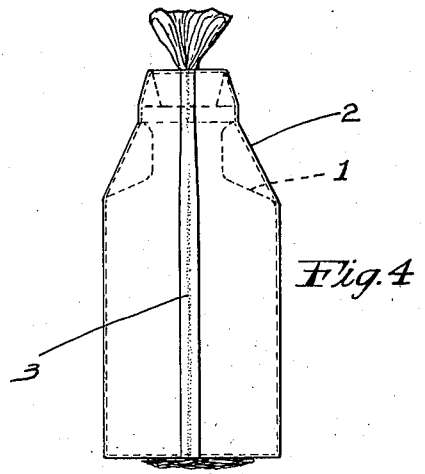
Inventor
James E. Snyder
By
Attorney Patented Sept. 16, 1941

2,256,156

UNITED STATES PATENT OFFICE 2,256,156

PACKAGING

James E. Snyder, Akron, Ohio, assignor to Wingfoot Corporation, Wilmington, Del., a corporation of Delaware Application July 12, 1939, Serial No. 284,006

9 Claims. (Cl. 93—2)

This invention relates to a method of packaging in a thin film of a rubber hydrochloride. More particularly it relates to binding a wrapper of such film around an article to be packaged by heating the ends of the film and causing portions of the wrapper protruding from different sides of the package to contact and cohere. The invention relates both to the method and to the article produced.

The film used in carrying out the invention may be the rubber hydrochloride film marketed by the Goodyear Tire & Rubber Company under the name "Pliofilm." It may be about 0.0008 to .0025 of an inch thick, or thinner film may be employed. The invention is applicable to the wrapping of many articles such as boxes, bottles, and bodies of irregular shape, etc. The wrapping of a bottle will be described more particularly and in connection with the accompanying drawing to illustrate the preferred form of the invention.

Fig. 1 shows a transparent film of a rubber hydrochloride wrapped around a bottle.

Fig. 2 shows the same film and bottle after the bottom of the film has been heated sufficiently to wilt it.

Fig. 3 shows the bottom portions of the film pressed against the bottom of the bottle.

Fig. 4 shows the finished package with the film twisted at the top of the bottle.

A rectangular sheet of rubber hydrochloride film 2 may be used for wrapping the bottle 1. After wrapping the film around the bottle it is preferably held in place at the seam by uniting overlapping portions by the application of heat, or by the use of adhesive or a confectioner's fold or by any suitable bonding means. A heat-sealed seam 3 is used for this purpose in Fig. 1. The seam is shown as sealed throughout only a portion of its length. This is all that is required to hold the film in place. A heated roller may be used for this purpose. The film is stiff enough so that by pressure with the roller a good seam is formed. It is not essential that the overlapping portions of the wrapper be united along the side of the bottle, but some means for holding them together facilitates the further steps described below. The film protruding from the bottom of the bottle is then heated. This may be done by hot air. For example, the end of the bottle may be held over a hot plate or inserted in a partially enclosed heated space, being careful not to permit the protruding wrapper to come in contact with the hot surface of the heater. Air heated to approximately 420° F. will have the desired effect on the film. When the film appears to wilt it has become soft and tacky. It is then removed from the source of heat and the seal is formed by stretching and folding the tacky film in against the bottom of the bottle. A slight stretch, sufficient to remove all wrinkles is all that is required. This procedure is repeated at the top of the bottle. A slight stretch followed by a twist may be used to close the top or bottom, instead of folding and pressing against the wrapped object.

The slight stretch prior to sealing causes the wrap to neatly bridge protruding edges of the wrapped object. The heated, bridged portions of the wrap may then be pressed in to conform exactly to the contour of the object. This produces a wrap of neat appearance so sealed as to keep the wrap in place and if carefully done with a heat-seal or other continuous seam along the side of the bottle or other package between the seals formed at the top and bottom, gives an hermetically sealed package. It is suitable for use on pharmaceutical bottles, cans, tubes, smoked hams, etc.

I claim:

1. The method of wrapping an article which comprises wrapping a thin sheet of rubber hydrochloride film around the article, heating at least one of the protruding ends of the wrap until it wilts, and pressing portions of the heated protruding film from different sides of the article together to cause them to cohere.

2. The method of wrapping an article which comprises wrapping a sheet of rubber hydrochloride film around the article, heating at least one of the protruding ends of the wrap until it wilts and pressing the heated protruding end of the film to the article with sufficient pressure to cause cohesion between overlapping portions of the heated film.

3. The method of wrapping an article which comprises wrapping a sheet of rubber hydrochloride film around the article, heating at least one of the protruding ends of the wrap until it wilts, slightly stretching the wilted end and pressing portions of the heated protruding film from different sides of the article together to cause them to cohere.

4. The method of wrapping an article which comprises wrapping a sheet of rubber hydrochloride film around the article, heating at least one of the protruding ends of the wrap until it wilts, gathering the wilted ends together and slightly stretching and twisting it to form a closure.

5. The method of wrapping a bottle which comprises wrapping a thin sheet of rubber hydrochloride around the bottle, heating the end of the film protruding beyond the bottom of the bottle until it wilts, slightly stretching and then pressing portions of the heated end of the film to the bottom with sufficient pressure to cause cohesion of the overlapping portions thereof, heating the end of the film protruding above the top of the bottle until it wilts and slightly stretching and pressing portions thereof to the top of the bottle with sufficient pressure to cause cohesion thereof.

6. The method of wrapping a bottle which comprises wrapping a sheet of rubber hydrochloride film around the bottle, heating the end of the film protruding beyond the bottom of the bottle until it wilts, gathering and slightly stretching and twisting the protruding end of the wrap to form a closure on the bottom of the bottle and heating the end of the film protruding above the top of the bottle until it wilts and gathering and slightly stretching and twisting the protruding end to form a closure.

7. The method of wrapping an object with thin rubber hydrochloride film, which comprises closing the protruding ends of the wrapper by heating and then pressing the heated areas of the wrap to the object to cause them to conform with the contour of the wrapped object.

8. An article with a wrapper of thin rubber hydrochloride film encircling a large portion of the body thereof, the wrapper being heat-wilted at at least one end thereof, and said end of the article being covered by cohesion of contacting surfaces of the heated portion of the film.

9. A bottle with a wrapper of thin rubber hydrochloride film around the body thereof, both ends of the wrapper being heat-wilted and the top and bottom of the bottle being covered by cohesion of contacting surfaces of the heat-wilted ends of the film.

JAMES E. SNYDER.